United States Patent
Philpott et al.

(10) Patent No.: US 12,480,554 B2
(45) Date of Patent: Nov. 25, 2025

(54) BRAKE ASSEMBLY HAVING A SENSOR UNIT

(71) Applicant: ArvinMeritor Technology, LLC, Troy, MI (US)

(72) Inventors: Daniel Philpott, Troy, MI (US); Alex Adkins, Troy, MI (US); Sukrut S. Sakhare, Troy, MI (US); Phillip G. Leicht, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 282 days.

(21) Appl. No.: 18/169,448

(22) Filed: Feb. 15, 2023

(65) Prior Publication Data

US 2024/0271675 A1 Aug. 15, 2024

(51) Int. Cl.
*F16D 66/02* (2006.01)

(52) U.S. Cl.
CPC .................................. *F16D 66/024* (2013.01)

(58) Field of Classification Search
CPC ...................................................... F16D 66/024
See application file for complete search history.

(56) References Cited

U.S. PATENT DOCUMENTS

| | | | | |
|---|---|---|---|---|
| 3,440,604 A * | 4/1969 | Phillips | ................. | F16D 66/024 200/61.4 |
| 3,674,114 A * | 7/1972 | Howard | .................. | F16D 66/00 188/1.11 R |
| 3,689,880 A * | 9/1972 | McKee | .................. | F16D 66/024 188/1.11 R |
| 3,800,278 A * | 3/1974 | Jaye | ...................... | F16D 66/024 200/61.4 |
| 4,298,857 A * | 11/1981 | Robins | ................... | F16D 66/024 200/61.4 |
| 4,344,509 A * | 8/1982 | Harmer | .................... | F16D 65/08 188/1.11 L |
| 4,387,789 A * | 6/1983 | Borugian | .............. | F16D 66/024 188/250 A |
| 4,742,326 A * | 5/1988 | Gregoire | ............... | F16D 66/024 188/1.11 R |
| 5,302,940 A * | 4/1994 | Chen | ..................... | F16D 66/024 200/61.4 |
| 5,839,545 A * | 11/1998 | Preston | ................. | F16D 66/024 340/454 |
| 5,939,978 A * | 8/1999 | Kyrtsos | ................. | F16D 66/024 188/1.11 R |
| 6,338,397 B1 * | 1/2002 | Gezgin | ................. | B60T 17/221 188/1.11 E |

(Continued)

FOREIGN PATENT DOCUMENTS

EP 0781936 A1 * 7/1997 ........... F16D 66/024

OTHER PUBLICATIONS

Sakhare et al., U.S. Appl. No. 17/676,530, filed Feb. 21, 2022; 37 pages.

(Continued)

*Primary Examiner* — Thomas W Irvin
(74) *Attorney, Agent, or Firm* — Dickinson Wright PLLC (57) ABSTRACT

A brake assembly that includes a brake pad assembly, a sensor unit, and a clip. The brake pad assembly has a table and friction material that extends from the table. The sensor unit is mounted to the table. The clip that straddles the sensor unit, engages the friction material, and is spaced apart from the table.

17 Claims, 6 Drawing Sheets

(56) References Cited

U.S. PATENT DOCUMENTS

| | | | |
|---|---|---|---|
| 6,360,850 B1* | 3/2002 | Odisho | F16D 66/026 |
| | | | 340/454 |
| 7,165,657 B2* | 1/2007 | Palladino | F16D 66/026 |
| | | | 188/1.11 E |
| 9,045,122 B2* | 6/2015 | Bosis | F16D 66/024 |
| 11,994,186 B2* | 5/2024 | Adkins | F16D 66/024 |
| 2005/0077122 A1 | 4/2005 | Harris et al. | |
| 2015/0369318 A1* | 12/2015 | Kang | F16D 66/024 |
| | | | 188/1.11 L |
| 2022/0049751 A1 | 2/2022 | Shah et al. | |

OTHER PUBLICATIONS

Adkins et al., U.S. Appl. No. 17/899,975, filed Aug. 31, 2022; 37 pages.

* cited by examiner

BRAKE ASSEMBLY HAVING A SENSOR UNIT

TECHNICAL FIELD

This relates to a brake assembly that has a sensor unit.

BACKGROUND

A drum brake system having a clip-on electronic lining wear sensor is disclosed in U.S. Patent Publication No. 2005/0077122.

SUMMARY

In at least one embodiment, a brake assembly is provided. The brake assembly includes a brake pad assembly, a sensor unit, and a clip. The brake pad assembly has a table and friction material that extends from the table. The sensor unit is mounted to the table. The clip straddles the sensor unit and engages the friction material.

The friction material may include a first friction material portion and a second friction material portion. A channel may be provided between the first friction material portion and the second friction material portion. The sensor unit may be received in the channel. The clip may be received in the channel. The clip may be spaced apart from the table.

The sensor unit may have a first lug. The sensor unit may have a second lug. The first lug and the second lug may cooperate to define a recess. The recess may receive the table. The first lug and the second lug may straddle the table. The first lug may be received in the channel. The first lug and/or the second lug may engage or contact the table.

The sensor unit may have a recess end surface. The recess end surface may extend from the first lug to the second lug. The table may contact the recess end surface. The sensor unit may extend further away from the table than the clip extends away from the table.

The sensor unit may have a sensor. The sensor may be disposed inside the first lug. A stiffener may be disposed inside the first lug. The sensor may be disposed on the stiffener. The sensor may extend further from the table than the stiffener extends from the table.

The first lug may have a distal end. The distal end may be disposed in the channel. The first lug may have a first set of ramps. The first set of ramps may extend toward the first friction material portion. The first lug may have a second set of ramps. The second set of ramps may be disposed opposite the first set of ramps. The second set of ramps may engage the second friction material portion. The clip may engage the distal end. The clip may engage the first set of ramps. The clip may engage the second set of ramps.

The clip may engage a first member of the first set of ramps. The clip may engage a first member of the second set of ramps. The first member of the first set of ramps may be disposed closest to the distal end. The first member of the second set of ramps may be disposed closest to the distal end. The stiffener may extend further from the distal end than the first set of ramps and/or the second set of ramps.

The clip may have a clip end wall. The clip may have a first clip side wall. The first clip side wall may extend from the clip end wall. The clip may have a second clip side wall. The second clip side wall may extend from the clip end wall. The second clip side wall may be spaced apart from the first clip side wall. The first clip side wall may contact the first friction material portion. The first clip side wall may contact the first lug. The second clip side wall may contact the second friction material portion. The second clip side wall may contact the first lug. The stiffener may be positioned between the first clip side wall and the second clip side wall. The sensor may be positioned between the first clip side wall and the second clip side wall. The stiffener and the sensor may be positioned in the channel.

The first lug may have a first slot end wall. The first slot end wall may be disposed in the channel. The first lug may have a first slot. The first slot may extend from the first slot end wall. The first slot may extend away from the distal end of the first lug. The first lug may have a first wing. The first wing may extend toward the first friction material portion. The first lug may have a first ramp. The first ramp may be disposed in the channel. The first ramp may be spaced apart from the first wing. The first slot may be disposed between the first wing and the first ramp.

The clip may be disposed closer to the table than the first slot end wall is disposed to the table. The sensor may be disposed closer to the table than the first slot end wall is disposed to the table.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
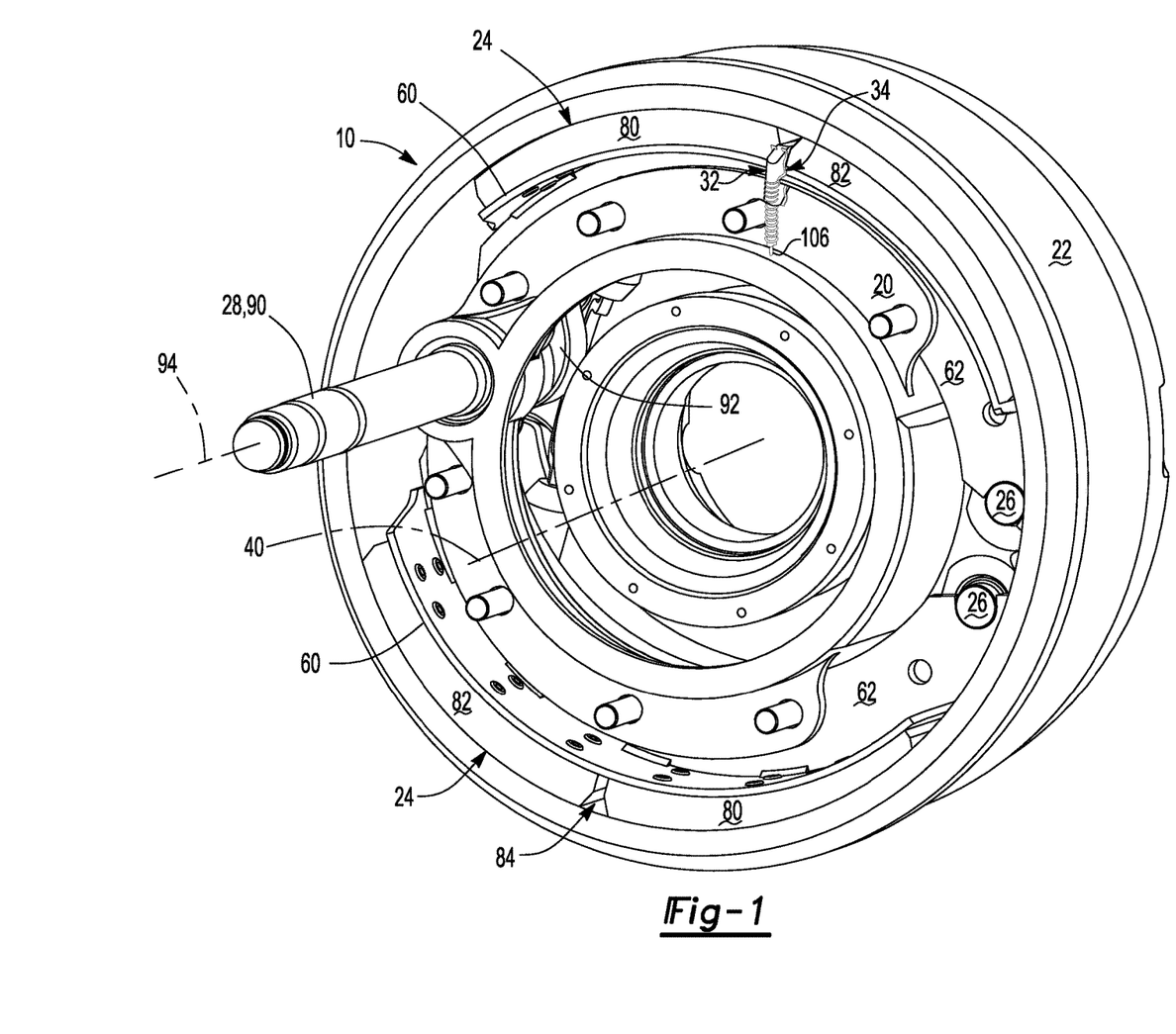
FIG. 1 is a perspective view of an example of a brake assembly.

Referring to FIG. 1, an example of a brake assembly 10 is shown. The brake assembly 10 may be provided with a vehicle like a truck, bus, farm equipment, mining equipment, military transport or weaponry vehicle, or cargo loading equipment for land, air, or marine vessels. The vehicle may include a trailer for transporting cargo in one or more embodiments.

The brake assembly 10 his configured to slow the rotation of a vehicle wheel. In the configuration shown, the brake assembly 10 is depicted as a drum brake assembly. In such a configuration, the brake assembly 10 includes a brake spider 20, a brake drum 22, at least one brake pad assembly 24, at least one anchor pin 26, and a camshaft 28. The brake assembly 10 also includes a sensor unit 30 and a first clip 32 and may optionally include a second clip 34. In FIG. 1, only one sensor unit 30 is shown; however, it is to be understood that a sensor unit 30, a first clip 32, and optionally a second clip 34 may be provided with both brake pad assemblies 24. It is also to be understood that that brake assembly 10 may alternatively be configured as a disc brake; however, the brake assembly 10 will primarily be described as a drum brake below.

The brake spider 20 facilitates mounting of the brake assembly 10 to a structural component of the vehicle. For instance, the brake spider 20 may be fixedly mounted to a steering knuckle or an axle housing. The brake spider 20 may be disposed inside the brake drum 22 and may support the anchor pin 26 and the camshaft 28.

The brake drum 22 encircles the brake spider 20 and the brake pad assemblies 24. The brake drum 22 may be fixedly mounted to a wheel hub and may be rotatable with the wheel hub about an axis 40. As such, the brake drum 22 may be rotatable about the axis 40 with respect to the brake spider 20 and the brake pad assemblies 24. The brake drum 22 may encircle the brake pad assemblies 24.

The brake pad assembly 24 is configured to engage an inner surface of the brake drum 22 that faces toward the axis 40 to slow rotation of the wheel hub about the axis 40. In the configuration shown, two brake pad assemblies 24 are illustrated that are disposed generally opposite each other. The brake pad assemblies 24 may be moveably disposed on the brake spider 20 and may partially encircle the brake spider 20. As is best shown with reference to FIG. 2, the brake pad assembly 24 may include a brake shoe 50 and a friction material 52.

The brake shoe 50 is a structural member of a brake pad assembly 24. The brake shoe 50 may be pivotally mounted to the brake spider 20 at a first end via the anchor pin 26, which is shown in FIG. 1. In at least one configuration, the brake shoe 50 includes a table 60 and at least one web 62.

The table 60 supports the friction material 52. In a drum brake configuration, the table 60 may be configured as a backplate that extends along an arc. In a disc brake configuration, the table may be configured as a generally flat backplate. In at least one configuration, the table 60 may include a first table side 70, a second table side 72, and at least one table end surface 74.

The first table side 70 may face toward and may engage the friction material 52. In a drum brake configuration, the first table side 70 may face away from the webs 62.

The second table side 72 may be disposed opposite the first table side 70. In a drum brake configuration, the second table side 72 may face away from the friction material 52 and may face toward the webs 62. In at least one configuration, the second table side 72 or a portion thereof may be disposed substantially parallel to the first table side 70. The term "substantially parallel" as used herein means the same as or very close to parallel and includes features or axes that are within ±3° of being parallel each other.

Figure 2:
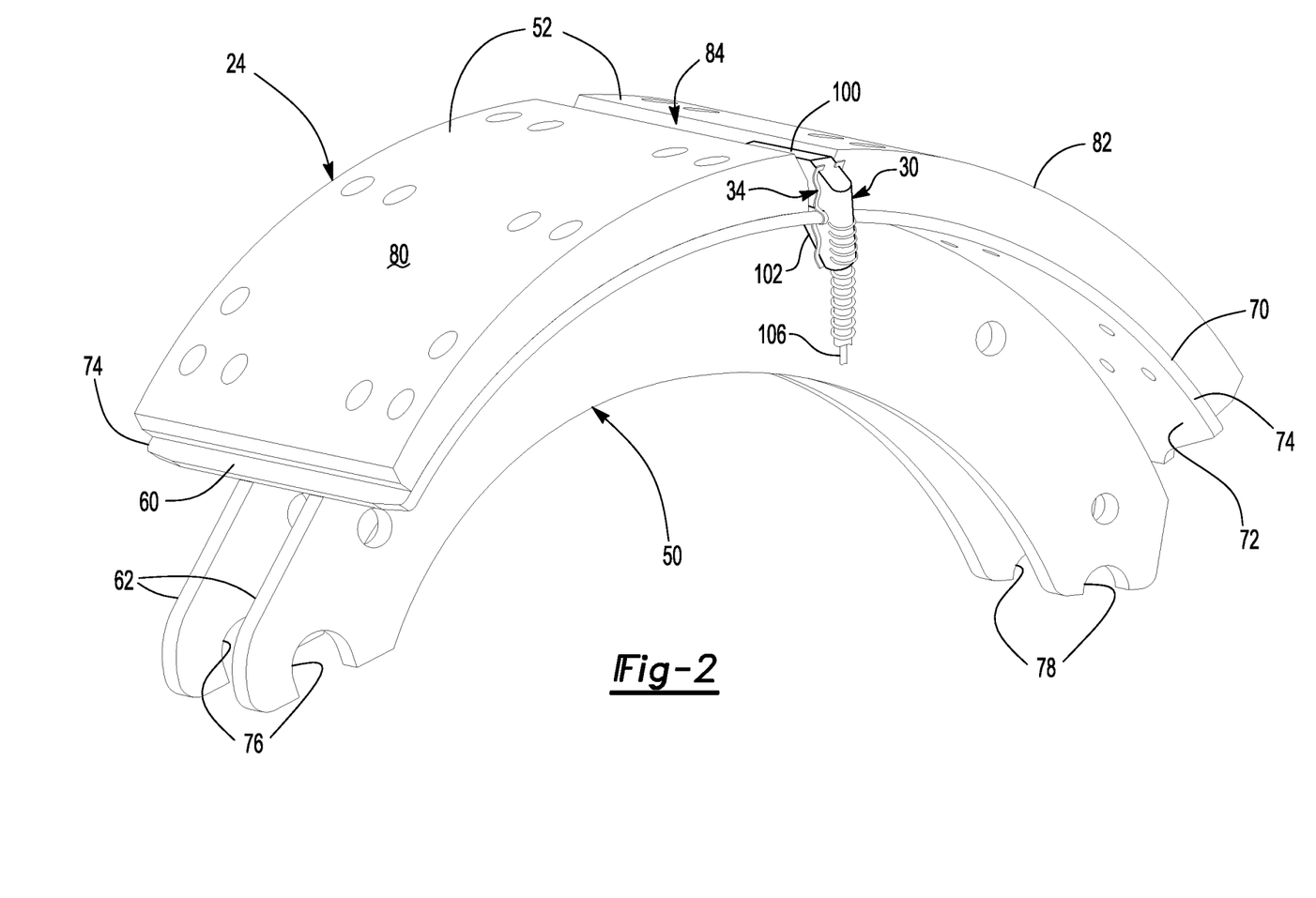
FIG. 2 is a perspective view of a brake pad assembly of the brake assembly and a sensor unit mounted to the brake pad assembly.

The table end surface 74 may extend between the first table side 70 and the second table side 72. For instance, the table end surface 74 may extend from an end of the first table side 70 to an end of the second table side 72. In at least one configuration, the table end surface 74 may be disposed substantially perpendicular to the first table side 70, the second table side 72, or both. The term "substantially perpendicular" is used herein to designate features or axes that are the same as or very close to perpendicular and includes features that are within ±3° of being perpendicular each other. In FIG. 2, the table end surface 74 extends along an arc and may be spaced apart from the webs 62.

In a drum brake configuration at least one web 62 may be provided with the brake shoe 50. In the configuration shown, two webs 62 are illustrated. The webs 62 extend from the table 60 and may be fixedly coupled to the table 60. For instance, the webs 62 may extend from the second table side 72 in a direction that extends away from the first table side 70 and may be welded to the second table side 72. The webs 62 may be spaced apart from (e.g. completely separated from) each other and may facilitate mounting of the brake pad assembly 24 to other components of the brake assembly 10. Each web 62 may extend along an arc between a first end and a second end. A first notch 76 may be provided at the first end and may receive the anchor pin 26. A second notch 78 may be provided at the second end and may receive a cam roller that is supported by the camshaft 28.

The friction material 52, which may also be called a brake lining, is disposed on the table 60. The friction material 52 may extend from the first table side 70 in a direction that extends away from the second table side 72. As such, the friction material 52 is oriented to face toward the inner surface of the brake drum 22 in a drum brake configuration. The friction material 52 may engage the inner surface of the brake drum 22 during vehicle braking and may be spaced apart from the brake drum 22 when the friction braking is not being applied. The friction material 52 may be attached to the table 60 in any suitable manner. For instance, the friction material 52 may be attached to the table 60 with a plurality of rivets.

In at least one configuration, the friction material 52 may include a first friction material portion 80 and a second friction material portion 82. The first friction material portion 80 and the second friction material portion 82 may be partially spaced apart from each other or completely spaced apart from each other such that a channel 84 is provided between the first friction material portion 80 and the second friction material portion 82. The channel 84 may extend to the first table side 70. In addition, the channel 84 may extend in a direction that extends from one table end surface 74 toward an opposing table end surface 74. In the configuration shown, the channel 84 is oriented substantially perpendicular to the table end surfaces 74.

Referring to FIG. 1, the anchor pin 26 is mounted to the brake spider 20 and supports the brake pad assembly 24. For example, the anchor pin 26 may be fixedly positioned with respect to the brake spider 20 and may be received in the first notches 76 of the webs 62 of the brake pad assembly 24 such that the brake shoe 50 may pivot with respect to the anchor pin 26 about an outer surface or outside circumference of the anchor pin 26 when the brake shoe 50 is actuated by the camshaft 28. It is also contemplated that the anchor pin 26 may be rotatably disposed on the brake spider 20 in other configurations, in which case the brake shoe 50 may pivot with the anchor pin 26. The anchor pin 26 may extend along an anchor pin axis that may be disposed substantially parallel to the axis 40.

The camshaft 28 is configured to actuate the brake pad assemblies 24. The camshaft 28 may have any suitable configuration. For instance, the camshaft 28 may have a shaft 90 and a cam portion 92.

The shaft 90 is rotatable about a camshaft axis 94. The shaft 90 may be rotatably supported on the brake spider 20.

The cam portion 92 extends from the shaft 90. The cam portion 92 may be configured as an S-cam that engages a cam roller that is disposed between the cam portion 92 and the webs 62 of the brake shoe 50. A cam roller may be received in the second notch 78 of the webs 62. Rotation of the camshaft 28 in a first direction about the camshaft axis 94 may cause the cam portion 92 to actuate the cam rollers and the brake pad assemblies 24 such that the friction material 52 moves toward or engages the inner surface of the brake drum 22 to brake or slow or inhibit rotation of an associated wheel. Rotation of the camshaft 28 about the camshaft axis 94 in a second direction that is opposite the first direction may allow the cam rollers and brake pad assemblies 24 to retract or disengage the inner surface of the brake drum 22. The camshaft 28 may be rotated by an actuator as is known by those skilled in the art.

Figure 3:
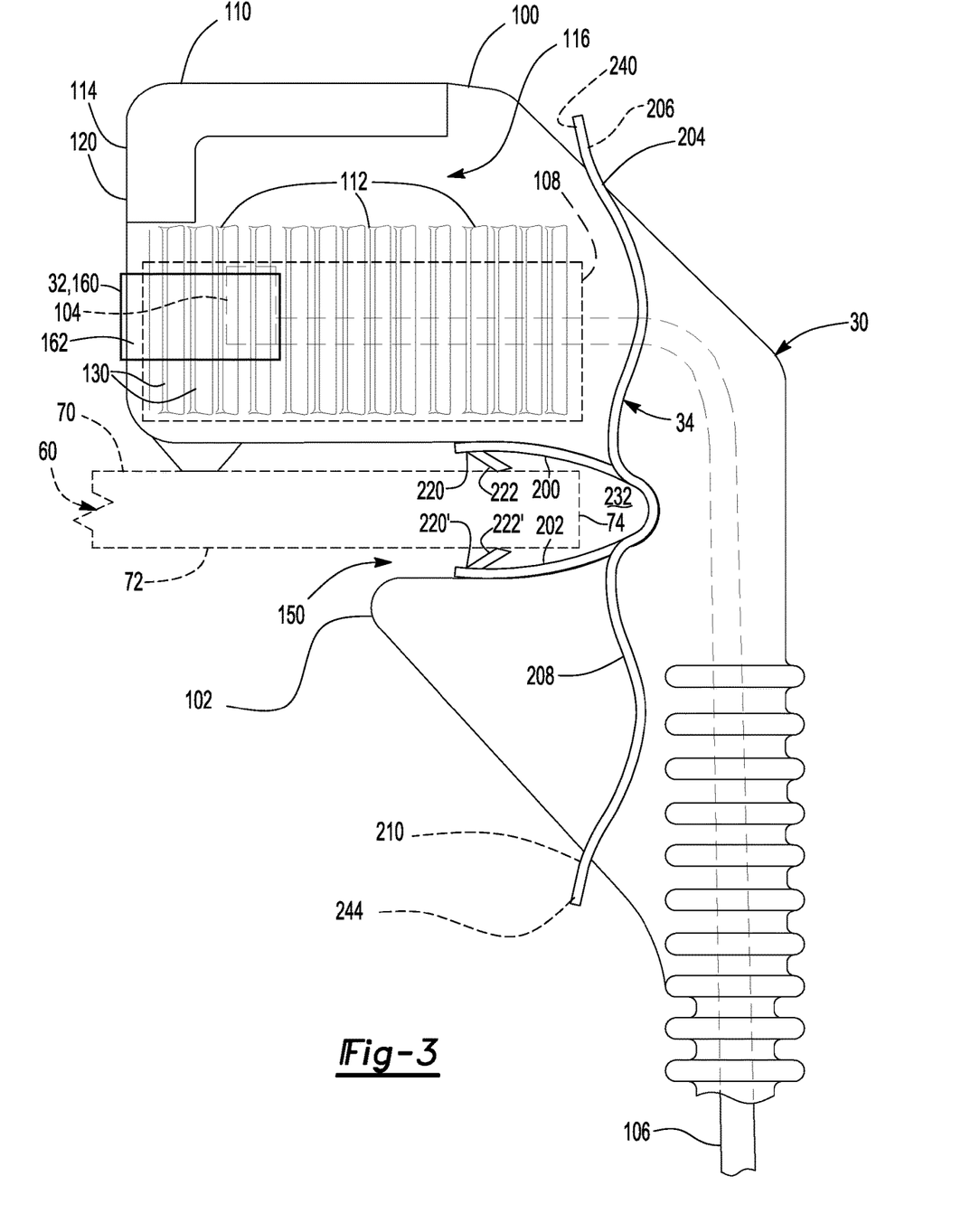
FIG. 3 is a side view of the sensor unit with a portion of the brake pad assembly shown in phantom for clarity.
Figure 5:
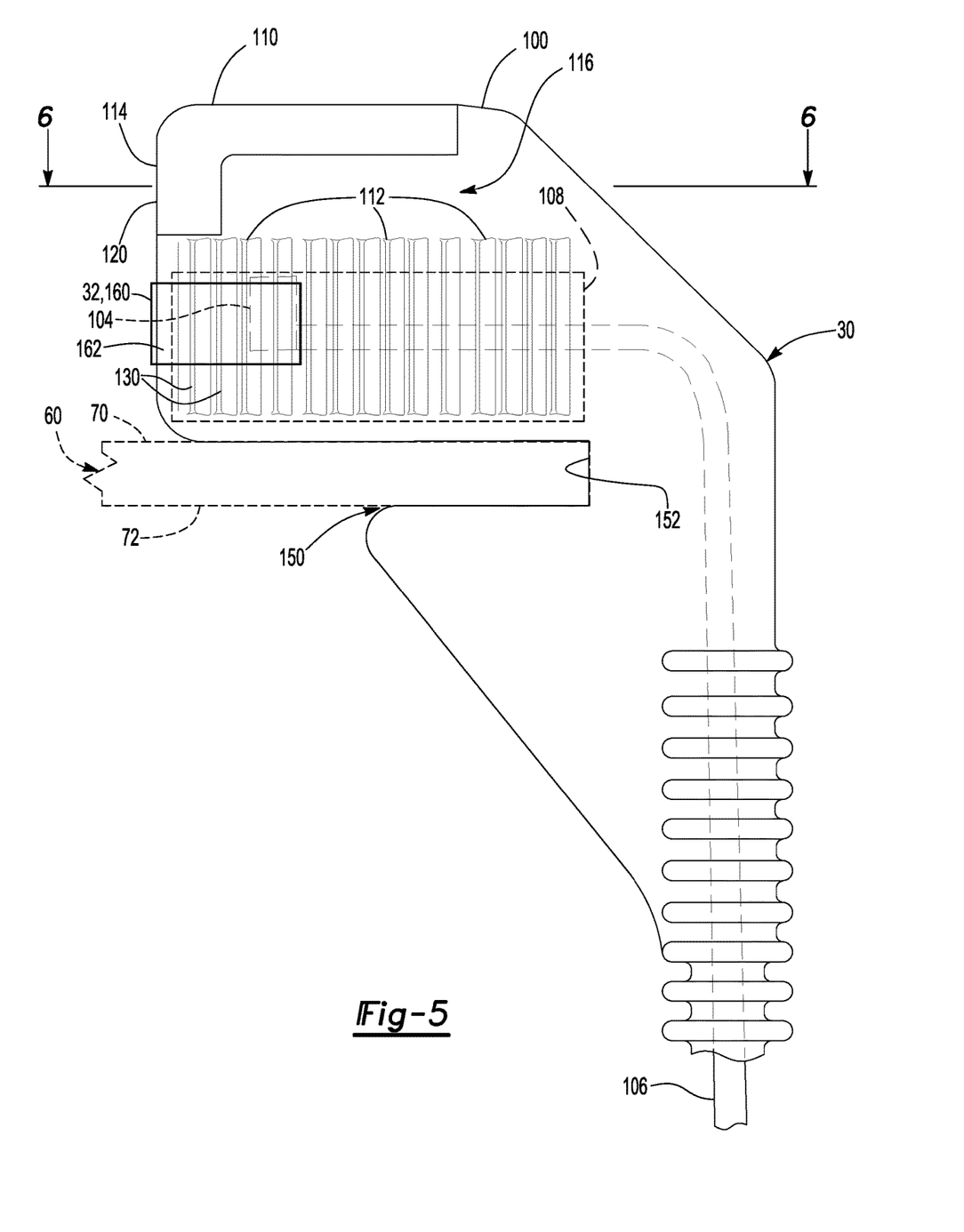
FIG. 5 is a side view of another configuration of a sensor unit with a portion of the brake pad assembly shown in phantom for clarity.

Referring to FIGS. 2, 3 and 5, the sensor unit 30 is mounted to the table 60 and is at least partially received in the channel 84. In the configuration shown in FIG. 3, the sensor unit 30 straddles the second clip 34 and the table 60 such that the sensor unit 30 engages opposing sides of the second clip 34 that face away from the table 60. For instance, the sensor unit 30 may straddle and contact or engage sides of the first clip arm 200 and the second clip arm 202 that face away from the table 60. In the configuration shown in FIG. 5, the second clip 34 is omitted and the sensor unit 30 straddles the table 60 and may engage or contact the table 60. In either configuration, the sensor unit 30 may include a first lug 100, a second lug 102, and at least one sensor 104. The sensor unit 30 may also include at least one electrical conductor 106, a stiffener 108, or both.

Referring primarily to FIGS. 3 and 5, the first lug 100 is disposed on or adjacent to a side of the table 60 from which the friction material 52 extends. For instance, the first lug 100 may extend from the first table side 70. The first lug 100 may be received in the channel 84 that is disposed between the first friction material portion 80 and the second friction material portion 82.

The first lug 100 may or may not contact the first table side 70. In the configuration shown in FIG. 5, the first lug 100 is illustrated as contacting the first table side 70. In the configuration shown in FIG. 3, the first lug 100 may contact the first table side 70 to a lesser extent or may be spaced apart from the first table side 70 due to the presence of the second clip 34. In this configuration, the first lug 100 is configured to contact or engage the second clip 34.

The first lug 100 may have various features that may help position, secure, or facilitate installation of the first lug 100 on the brake pad assembly 24. For example, the first lug 100 may include one or more wings 110, one or more ramps 112, one or more slot end walls 114, one or more slots 116, or combinations thereof. The first lug 100 will be described below as having the same features on both lateral sides of the first lug 100 unless otherwise specified.

One or more wings 110, if provided, may be disposed proximate the top of the first lug 100. As such, a wing 110 may be disposed proximate a top side of the first lug 100 that is disposed opposite the table 60. A wing 110 may protrude from the first lug 100 and extend toward a portion of the friction material 52. For instance, a first wing 110 may extend toward the first friction material portion 80 while a second wing 110 may be disposed opposite the first wing 110 and may extend toward the second friction material portion 82. The wings 110 may be at least partially received in the channel 84 and may rest on a chamfered or angled surface of the friction material 52 to help resist over-compression or mispositioning of the first lug 100 in a direction that extends toward the table 60. As such, the wings 110 may help position a sensor 104 that is disposed inside of the first lug 100 at a desired elevation from the first table side 70. It is also contemplated that the wings 110 may be omitted.

One or more ramps 112 may protrude from the first lug 100 toward the friction material 52. For instance, a first ramp or a first set of ramps 112 may extend toward and may engage or contact the first clip 32 and/or the first friction material portion 80 while a second ramp or a second set of ramps 112 may be generally disposed opposite the first ramp or the first set of ramps 112 and may extend toward and may engage or contact the first clip 32 and/or the second friction material portion 82. The ramps 112 may be received in the channel 84. In at least one configuration, the ramps 112 may be spaced apart from the wings 110. For example, the ramps 112 may be disposed closer to the first table side 70 than the wings 110 or further down from the perspective shown in FIGS. 3 and 5. In FIGS. 3 and 5, a set of ramps 112 is illustrated that includes three ramps 112; however, it is contemplated that a greater or lesser number of ramps may be provided. The ramps 112 may be arranged between a distal end 120 of the first lug 100 and a side of the first lug 100 that is disposed opposite the distal end 120. The distal end 120 may be received in the channel 84.

Figure 6:
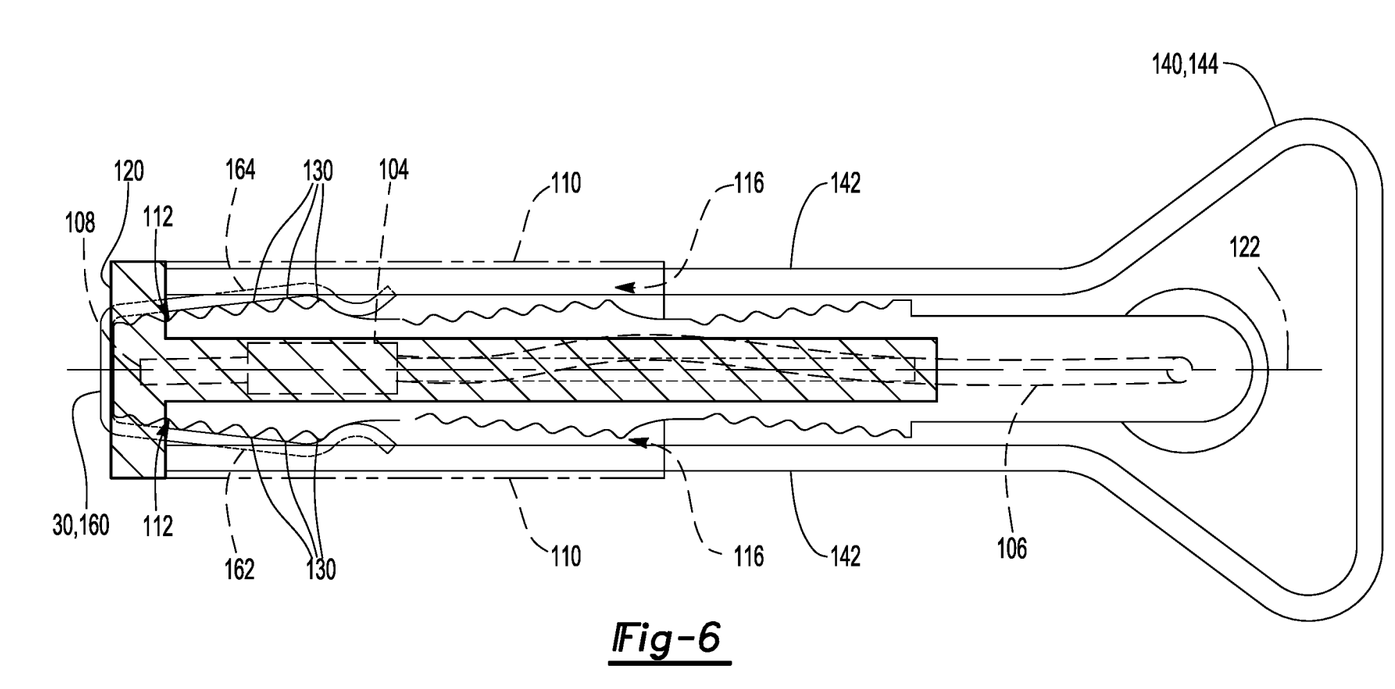
FIG. 6 is a section view of the sensor unit shown in FIG. 5 along section line 5-5 with wings of the sensor unit shown in phantom and an example of a tool for installing the sensor unit on the brake pad assembly.

The ramps 112 may be compressed or deformed when inserted into the channel 84 to help inhibit removal of the first lug 100 from the channel 84. In a free state or uncompressed state like that shown in FIGS. 3 and 5, the ramps 112 may be angled to protrude further outboard as the distance from the distal end 120 of the first lug 100 increases. For instance, as is best shown in FIG. 6, a ramp 112 may extend further away from a center plane 122 as the distance from the distal end 120 increases. The center plane 122 may be a plane that may extend through the first lug 100 and the second lug 102 and may be disposed proximate the center of the sensor unit 30. The center plane 122 may be positioned between or centered between the first friction material portion 80 and the second friction material portion 82 when the sensor unit 30 is installed in the channel 84. Orienting the ramps 112 in this manner may make it easier to insert the first lug 100 into the channel 84 as compared to removing the first lug 100 from the channel 84.

Optionally, a ramp 112 may include a set of teeth 130. The teeth 130 may extend between the first table side 70 and a corresponding wing 110, or in a generally vertical direction from the perspective shown in FIGS. 3 and 5. The teeth 130 may extend away from the center plane 122 and may help grip a corresponding friction material portion. As is best shown in FIG. 6, the teeth 130 of ramps 112 that extend from opposite lateral sides of the first lug 100 may be offset from each other. For instance, the teeth 130 of a first ramp 112 may be offset from the teeth 130 of a second ramp 112 such that the peaks of the teeth are not aligned. In the example shown, the teeth 130 are positioned out of phase such that the peak of a tooth 130 that extends from a first ramp 112 is aligned with the valley between adjacent teeth 130 of an opposing second ramp 112. Such positioning may help improve gripping effectiveness of the teeth 130.

Referring to FIGS. 3 and 5, one or more slot end walls 114 may be generally disposed between a wing 110 and a ramp 112. In the configuration shown, a slot end wall 114 extends from the wing 110 toward the table 60 and optionally toward or to a ramp 112. As such, the slot end wall 114 may be disposed in the channel 84 when the sensor unit 30 is mounted to the table 60. The slot end wall 114 may protrude laterally from the first lug 100 and extend toward a portion of the friction material 52. For example, a first slot end wall 114 may extend toward the first friction material portion 80 while a second slot end wall 114 may be disposed opposite the first slot end wall 114 and may extend toward the second friction material portion 82. The slot end wall 114 may be disposed proximate or extend from the distal end 120 of the first lug 100 in a direction that extends away from the distal end 120 or to the right from the perspective shown. The slot end wall 114 may form a closed end of the slot 116 and may be engaged by a tool that facilitates installation of the first lug 100 as will be discussed in more detail below.

One or more slots 116 may be provided with the first lug 100. A slot 116 may be positioned adjacent to a ramp 112, such as between a wing 110 and a ramp or set of ramps 112. In addition, a slot 116 may extend from a corresponding slot end wall 114 in a direction that extends away from the distal end 120 of the first lug 100, or to the right from the perspective shown. Thus, a slot 116 may be disposed between a wing 110, the set of ramps 112, and the slot end wall 114 and may be open at an end that is disposed opposite the slot end wall 114. A corresponding second slot 116 may be disposed on an opposite side of the first lug 100 from the slot 116.

As is best shown in FIG. 6, one or more slots 116 may be configured to receive a tool 140 that may facilitate installation of the first lug 100 into the channel 84. In the configuration shown, the tool 140 has a pair of rods or shafts 142 that extend from a head 144. A rod or shaft 142 of the tool 140 may be aligned with a corresponding slot 116, inserted into the open end of a corresponding slot 116, and advanced into the slot 116 to engage a corresponding slot end wall 114. Force may be exerted toward the slot end wall 114 that may move the first lug 100 into the channel 84 and inhibit the first lug 100 from binding during insertion. Over-insertion or stretching of the first lug 100 by the tool may be resisted by the first clip 32 and the second clip 34, if provided.

Referring to FIGS. 3 and 5, the second lug 102 may be disposed on an opposite side of the table 60 from the first lug 100. The second lug 102 may be disposed adjacent to the second table side 72. As such, the second lug 102 may not be received in the channel 84 and may not be disposed between the first friction material portion 80 and the second friction material portion 82. Accordingly, the first lug 100 and the second lug 102 may straddle the table 60 such that the first lug 100 is received in the channel 84 and the second lug 102 is not received in the channel 84. The first lug 100 may have a greater length than the second lug 102.

The second lug 102 may or may not contact the second table side 72. In the configuration shown in FIG. 5, the second lug 102 is illustrated as contacting the second table side 72. In the configuration shown in FIG. 3, the second lug 102 is partially spaced apart from and may not contact the second table side 72 due to the presence of the second clip 34.

Referring to FIGS. 3 and 5, the first lug 100 and the second lug 102 may cooperate to define a recess 150 that receives the table 60. In the configuration in FIG. 3, the recess 150 also receives the second clip 34. The recess 150 may be defined by an inner side of the first lug 100 that faces toward and may engage the first clip arm 200 and an inner side of the second lug 102 that faces toward and may engage the second clip arm 202. The recess 150 may also be partially defined by a recess end surface 152. The recess end surface 152 may extend from the first lug 100 to the second lug 102. The table 60 may contact the recess end surface 152.

The first lug 100 and the second lug 102 may be integrally formed as a unitary one-piece component. For instance, the first lug 100 and the second lug 102 may be integrally formed of a polymeric material, such as silicone that can withstand the temperatures associated with braking while maintaining sufficient structural integrity (e.g., without melting). Moreover, such a material may limit heat absorption and help provide a degree of thermal insulation that may help protects sensor 104 inside the sensor unit 30.

Features of the sensor unit 30 may also be used facilitate removal from the channel 84. For instance, the first lug 100, the second lug 102, portion of the sensor unit 30 that extends around or encapsulates the electrical conductors 106, or combinations thereof may be grasped and pulled to disengage the sensor unit 30.

At least one sensor 104 is provided with the first lug 100. The sensor 104 may be disposed inside or encapsulated in the first lug 100 of the sensor unit 30. For instance, the sensor 104 may be positioned between the inner side of the first lug 100 that faces toward the table 60 and an opposing outer side of the first lug 100 that faces away from the table 60 when the first lug 100 is unworn. The sensor 104 may be at least partially located in the channel 84 when the sensor unit 30 is installed. The sensor 104 may provide a signal indicative of wear of the friction material 52. For example, the friction material 52 may contact the brake drum 22 during braking, which may cause the friction material 52 to wear and decrease in thickness. After sufficient wear occurs, the side of the friction material 52 that faces toward the brake drum 22 may be generally aligned with the outer side of the first lug 100. As a result, additional brake applications may result in engagement of the friction material 52 and the first lug 100 with the brake drum 22 and wear of both the friction material 52 and the first lug 100.

After sufficient wear occurs, the sensor 104 or a portion thereof may be exposed and may contact the brake drum 22 during braking and provide a signal that may be indicative of wear of the friction material 52. Such a signal may indicate that the brake pad assembly 24 should be replaced soon. For example, the signal may be generated by the sensor 104 or may be associated with opening or closing an electrical circuit. For instance, the engagement of the brake drum 22 with the sensor 104 may sever or otherwise disconnect a normally continuous electrical circuit, resulting in a change to one or more electrical attributes, such as current or voltage, which may be detected or identified by an electronic controller that may receive the signal in a manner known by those skilled in the art.

In addition or alternatively, the sensor 104 may provide a signal indicative of temperature of the brake pad assembly 24. For example, the sensor 104 may include a thermocouple, thermistor, semiconductor temperature sensor, or the like.

It is contemplated that the sensor 104 may include a printed circuit board that is encapsulated in the first lug 100. The material of the first lug 100 may extend through holes in the printed circuit board during manufacture to help hold the sensor 104 in a desired position.

One or more electrical conductors 106 may be electrically connected to the sensor 104 or sensors provided with the sensor unit 30. An electrical conductor 106 may be of any suitable type, such as a wire, ribbon, or the like. An electrical conductor 106 may be provided with an insulator or coating that may help withstand operating temperatures. For instance, in electrical conductor 106 may be lacquer-coated, which may also help reduce the amount of sheathing or insulating material provided around an electrical conductor 106. The electrical conductor 106 may provide power to the sensor 104, provide a signal to an external control system or electronic controller, or both. The electrical conductor 106 may be partially encompassed by or protected by the first clip 32 and the second clip 34 if provided. An electrical conductor 106 may be surrounded or encircled by annular protrusions or ribs that may help provide abrasion resistance and thermal separation.

The stiffener 108 is disposed inside the first lug 100. The stiffener 108 may help stiffen the surrounding material of the first lug 100, such as silicone, to make the first lug 100 easier to install in the channel 84, to help maintain the orientation and positioning of the sensor 104, or combinations thereof. In at least one configuration, the sensor 104 may be disposed on the stiffener 108. As is best shown in FIGS. 3 and 5, the sensor 104 may extend further from the table 60 than the stiffener 108, thereby allowing the sensor 104 to be exposed in response to wear of the surrounding material before the stiffener 108 is exposed. The stiffener 108 may extend further toward the table 60 or further down from the perspective shown than the sensor 104 extends toward the table 60. As such, the stiffener 108 may be at least partially located in the channel 84 and may be disposed between opposing ramps 112 that extend to engage the first friction material portion 80 and the second friction material portion 82 to help provide more stiffening in the portion of the first lug 100 that is installed in the channel 84. The stiffener 108 may extend further toward the distal end 120 of the first lug 100 or further left from the perspective shown than the ramps 112. The stiffener 108 may extend in a direction that extends away from the distal end 120 or further to the right from the perspective shown than the first set of ramps 112, the second set of ramps 112, the sensor 104, or combinations thereof. As such, the stiffener 108 may extend along approximately the length of the first lug 100 that is received in the channel 84.

Referring to FIGS. 3, 5 and 6, the first clip 32 facilitates mounting of the sensor unit 30 to the brake pad assembly 24. The first clip 32 may be a separate component from the sensor unit 30 and may be made from a different material. For instance, the first clip 32 may be made of metal or a harder polymeric material than the first lug 100. As such, the first clip 32 may have a greater degree of stiffness or rigidity than material of the first lug 100 and may limit deformation of the first lug 100, such as bending, twisting, compression and the like.

The first clip 32 straddles the sensor unit 30 and may be spaced apart from the table 60. The first clip 32 is received in the channel 84 when the sensor unit 30 is installed and is configured to engage the friction material 82. For instance, the first clip 32 may engage the first friction material portion 80 and the second friction material portion 82. As is best shown in FIGS. 3 and 5, the first clip 32 may be aligned with the ramps 112, may engage one or more ramps, and may be disposed closer to the table 60 than the sensor 104 so as to not be worn by the brake drum 22. As such, the sensor unit 30 may extend further away from the table 60 than the first clip 32 extends from the table 60. The first clip 32 and the sensor 104 may be disposed closer to the table 60 than the first slot end wall 114, the slot 116, the wings 110 or combinations thereof are disposed to the table 60. In at least one configuration, the first clip 32 may have a clip end wall 160, a first clip side wall 162, and a second clip side wall 164.

Referring primarily to FIG. 6, the clip end wall 160 is disposed at an end of the first clip 32. The clip end wall 160 may be disposed proximate or may engage or contact the distal end 120 of the first lug 100.

The first clip side wall 162 extends from the clip end wall 160. For example, the first clip side wall 162 may extend from a first end of the clip end wall 160. The first clip side wall 162 may be disposed in the channel 84 and may engage the first friction material portion 80 and the first lug 100 when the sensor unit 30 is installed. For instance, the first clip side wall 162 may contact the first friction material portion 80 and the first lug 100. The first clip side wall 162 may engage a ramp 112, such as a member of the first set of ramps 112 like a ramp 112 disposed closest to the distal end 120. In at least one configuration, the first clip side wall 162 may have a portion that extends toward the center plane 122 to help secure the first clip 32 to the first lug 100. In the configuration shown, the first clip side wall 162 has a hook or portion that extends toward the center plane 122 that is located near the free end of the first clip side wall 162 that is disposed opposite the clip end wall 160.

The second clip side wall 164 is spaced apart from the first clip side wall 162. The second clip side wall 164 extends from the clip end wall 160. For example, the second clip side wall 164 may extend from a second end of the clip end wall 160 that is disposed opposite the first end. The second clip side wall 164 may be disposed in the channel 84 and may engage the second friction material portion 82 and the first lug 100 when the sensor unit 30 is installed. For instance, the second clip side wall 164 may contact the second friction material portion 82 and the first lug 100. The second clip side wall 164 may engage a ramp 112, such as a member of the second set of ramps 112 like a ramp 112 disposed closest to the distal end 120. In at least one configuration, the second clip side wall 164 may be a mirror image of the first clip side wall 162. The second clip side wall 164 may have a portion that extends toward the center plane 122 to help secure the first clip 32 to the first lug 100. In the configuration shown, the second clip side wall 164 has a hook or portion that extends toward the center plane 122 that is located near the free end of the second clip side wall 164 that is disposed opposite the clip end wall 160. The sensor 104 and the stiffener 108 may be positioned between the first clip side wall 162 and the second clip side wall 164.

Figure 4:
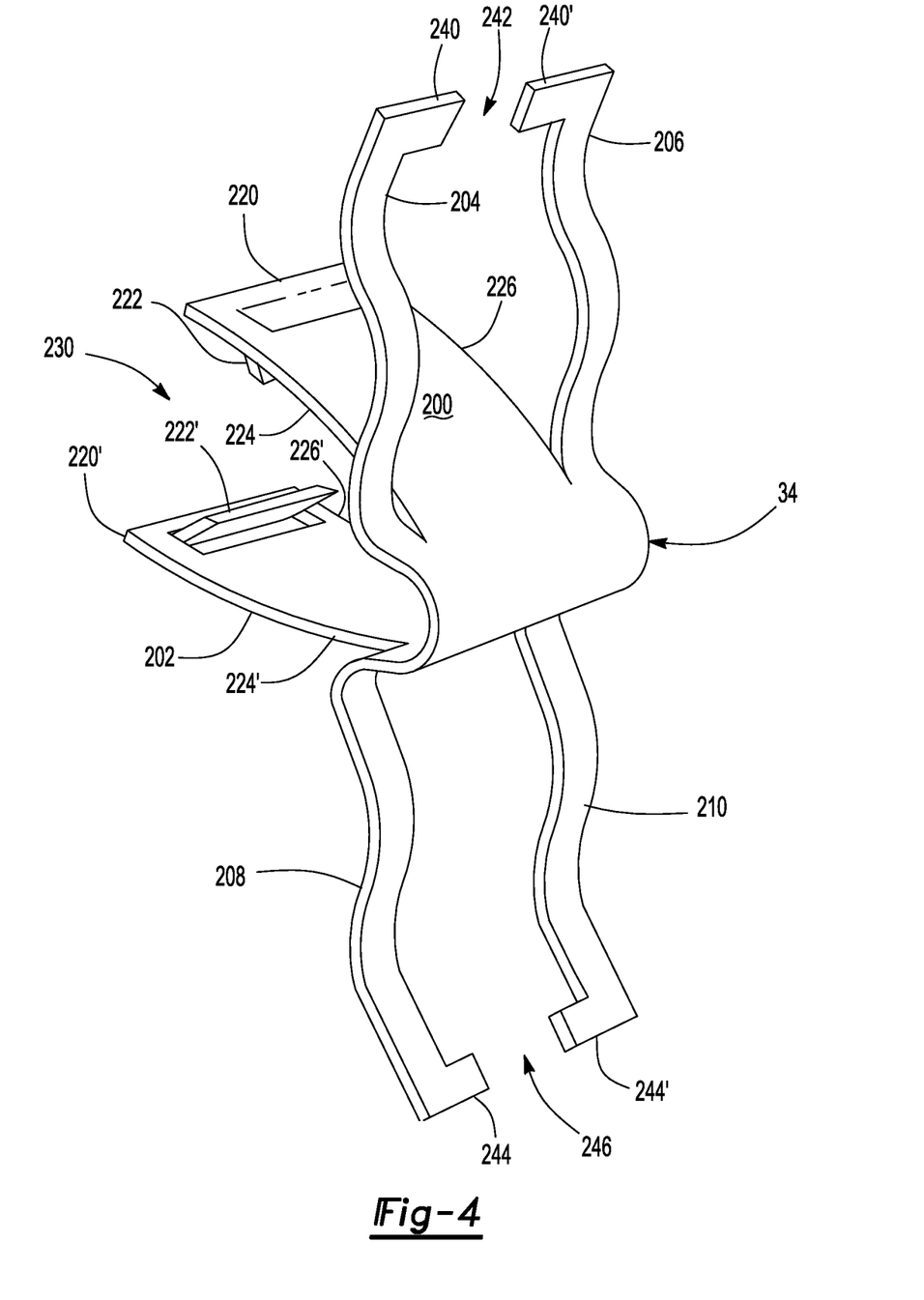
FIG. 4 is a perspective view of a clip that can be provided with the sensor unit.

Referring to FIGS. 3 and 4, the second clip 34 facilitates mounting of the sensor unit 30 to the brake pad assembly 24.

For instance, the second clip 34 is mounted to the brake shoe 50 and the sensor unit 30 is mounted to the second clip 34. The second clip 34 straddles and engages the table 60 and may extend into the channel 84 that is disposed between the first friction material portion 80 and the second friction material portion 82. The second clip 34 may be made of any suitable material or materials. For example, the second clip 34 may be made of a polymeric material or metal. The second clip 34 may have a greater degree of stiffness or rigidity than at least a portion of the sensor unit 30. As such, the second clip 34 may limit deformation of the sensor unit 30, such as bending, twisting, compression and the like. In at least one configuration, the second clip 34 includes a first clip arm 200, a second clip arm 202. The second clip 34 may also include a first side arm 204, a second side arm 206, a third side arm 208, a fourth side arm 210, or combinations thereof.

The first clip arm 200 is configured to engage or contact the table 60. For instance, the first clip arm 200 may engage the first table side 70 of the table 60. The first lug 100 may contact or engage the first clip arm 200 and may have a greater length than the first clip arm 200. The first clip arm 200 may have a distal end 220. The first lug 100 may extend past the distal end 220 of the first clip arm 200. The distal end 220 may be received inside the channel 84. A retention barb 222 may be disposed proximate the distal end 220. The retention barb 222 may extend toward the first table side 70 and may contact or engage the first table side 70 to help secure the first clip arm 200 to the table 60 and inhibit removal of the second clip 34. The first clip arm 200 may extend laterally between a first lateral side 224 and a second lateral side 226 that may be disposed opposite the first lateral side 224.

The second clip arm 202 may be disposed opposite the first clip arm 200. The second clip arm 202 is configured to engage or contact the table 60. For instance, the second clip arm 202 may engage the second table side 72 of the table 60 and may be spaced apart from the first table side 70. The second clip arm 202 may have a distal end 220'. The distal end 220' faces toward an adjacent web 62 of the brake shoe 50 and is not received inside the channel 84. A retention barb 222' may be disposed proximate the distal end 220'. The retention barb 222' may extend toward the second table side 72 and may contact or engage the second table side 72 to help secure the second clip arm 202 to the table 60 and inhibit removal of the second clip 34. The second clip arm 202 may extend laterally between a first lateral side 224' and a second lateral side 226' that may be disposed opposite the first lateral side 224'. In at least one configuration, the first lateral side 224 may be contiguous with the first lateral side 224' and the second lateral side 226 may be contiguous with the second lateral side 226'. The second lug 102 may have a greater length than the second clip 34. For instance, the second lug 102 may extend past the distal end 220' of the second clip arm 202.

The first clip arm 200 and the second clip arm 202 may cooperate to define an aperture 230. The aperture 230 is disposed between the first clip arm 200 and the second clip arm 202 and is configured to receive the table 60. In the configuration shown, the first clip arm 200 and the second clip arm 202 have substantially similar configurations and extend from each other; however, it is contemplated that the first clip arm 200 and the second clip arm 202 may not extend from each other. For instance, rather than having a generally parabolic profile as shown in FIG. 3, the first clip arm 200 and the second clip arm 202 may both extend from an intermediate wall that may bridge or connect the first clip arm 200 to the second clip arm 202. In the configuration shown, a gap 232 may be disposed between the table 60 and the closed end of the aperture 230. For example, the gap 232 may be disposed between the table end surface 74 and the second clip 34 at the closed end of the aperture 230.

The first side arm 204 helps orient and retain the sensor unit 30 on the second clip 34. The first side arm 204 may extend from the first clip arm 200. For instance, the first side arm 204 may extend from the first clip arm 200 in a direction that extends away from the second clip arm 202. The first side arm 204 may be positioned near the closed end of the aperture 230 and may extend away from the aperture 230. As such, the first side arm 204 may be spaced apart from the distal end 220 of the first clip arm 200. The first side arm 204 may be disposed proximate or may extend from the first lateral side 224 of the first clip arm 200. In at least one configuration, the first side arm 204 may be spaced apart from the second side arm 206 and may have a first hook 240.

The first hook 240 may be disposed proximate a distal end of the first side arm 204. The first hook 240 may be configured to engage and help secure the sensor unit 30 as will be discussed in more detail below. The first hook 240 may extend toward the second side arm 206.

The second side arm 206 helps orient and retain the sensor unit 30 on the second clip 34. The second side arm 206 may be disposed opposite the first side arm 204. The second side arm 206 may extend from the first clip arm 200. For instance, the second side arm 206 may extend from the first clip arm 200 in a direction that extends away from the second clip arm 202. The second side arm 206 may be positioned near the closed end of the aperture 230 and may extend away from the aperture 230. As such, the second side arm 206 may be spaced apart from the distal end 220 of the first clip arm 200. The second side arm 206 may be disposed proximate or may extend from the second lateral side 226 of the first clip arm 200. In at least one configuration, the second side arm 206 may have a second hook 240'.

The second hook 240' may be disposed proximate a distal end of the second side arm 206. The second hook 240' may be configured to engage and help secure the sensor unit 30 as will be discussed in more detail below. The second hook 240' may extend toward the first side arm 204.

The first hook 240 and the second hook 240' may be spaced apart from each other such that a passage 242 is provided between the first hook 240 and the second hook 240'. It is also contemplated that the passage 242 may be omitted in one or more configurations. For instance, the first hook 240 and the second hook 240' may be contiguous rather than spaced apart from each other and form a bridge that may cooperate with the first clip arm 200, the first side arm 204, and the second side arm 206 to define an enclosed window that has a perimeter that is bounded and surrounded by these features.

The first lug 100 may be laterally positioned between the first side arm 204 and the second side arm 206 of the second clip 34, such as by inserting the first lug 100 through the passage 242 of the second clip 34. For instance, the first side arm 204 may extend along a first lateral side of the first lug 100 while the second side arm 206 may extend along a second lateral side of the first lug 100 that is disposed opposite the first lateral side. It is noted that the second side arm 206 is disposed directly behind the first side arm 204 in FIG. 3.

The first hook 240 of the first side arm 204 and the second hook 240' of the second side arm 206 may be configured to engage the first lug 100. For instance, the first hook 240, the second hook 240', or both may engage a first upper surface of the first lug 100 that faces away from the first clip arm 200 and that may be at least partially disposed outside of the channel 84. Alternatively or in addition, the first hook 240 and the second hook 240' may be configured to engage opposing lateral sides of the first lug 100. As such, the first hook 240 and the second hook 240' may help inhibit movement of the first lug 100 in a direction that extends away from the first table side 70.

The third side arm 208 helps orient and retain the sensor unit 30 on the second clip 34. The third side arm 208 may extend from the second clip arm 202. For instance, the third side arm 208 may extend from the second clip arm 202 in a direction that extends away from the first clip arm 200. The third side arm 208 may be positioned near the closed end of the aperture 230 and may extend away from the aperture 230. As such, the third side arm 208 may be spaced apart from the distal end 220 of the second clip arm 202. The third side arm 208 may be disposed proximate or may extend from the first lateral side 224' of the second clip arm 202. For example, the third side arm 208 may be disposed opposite the first side arm 204 and may be oriented such that the first side arm 204 and the third side arm 208 extend in opposite directions with respect to each other. In at least one configuration, the third side arm 208 may be spaced apart from the fourth side arm 210 and may have a third hook 244.

The third hook 244 may be disposed proximate a distal end of the third side arm 208. The third hook 244 may be configured to engage and help secure the sensor unit 30 as will be discussed in more detail below. The third hook 244 may extend toward the fourth side arm 210.

The fourth side arm 210 helps orient and retain the sensor unit 30 on the second clip 34. The fourth side arm 210 may be disposed opposite the third side arm 208. The fourth side arm 210 may extend from the second clip arm 202. For instance, the fourth side arm 210 may extend from the second clip arm 202 in a direction that extends away from the first clip arm 200. The fourth side arm 210 may be positioned near the closed end of the aperture 230 and may extend away from the aperture 230. As such, the fourth side arm 210 may be spaced apart from the distal end 220 of the second clip arm 202. The fourth side arm 210 may be disposed proximate or may extend from the second lateral side 226' of the second clip arm 202. For example, the fourth side arm 210 may be disposed opposite the second side arm 206 and may be oriented such that the second side arm 206 and the fourth side arm 210 extend in opposite directions with respect to each other. In at least one configuration, the fourth side arm 210 may have a fourth hook 244'.

The fourth hook 244' may be disposed proximate a distal end of the fourth side arm 210. The fourth hook 244' may be configured to engage and help secure the sensor unit 30 as will be discussed in more detail below. The fourth hook 244' may extend toward the third side arm 208.

The third hook 244 and the fourth hook 244' may be spaced apart from each other such that a passage 246 is provided between the third hook 244 and the fourth hook 244'. It is also contemplated that the passage 246 may be omitted in one or more configurations.

The third hook 244 of the third side arm 208 and the fourth hook 244' of the fourth side arm 210 may be configured to engage the second lug 102. For instance, the third hook 244, the fourth hook 244', or both may engage a side surface of the second lug 102 that faces away from the second clip arm 202 and that may be disposed outside of the channel 84. Alternatively or in addition, the third hook 244 and the fourth hook 244' may be configured to engage opposing lateral sides of the second lug 102. As such, the third hook 244 and the fourth hook 244' may help inhibit movement of the second lug 102 in a direction that extends away from the second table side 72.

The second lug 102 may be laterally positioned between the third side arm 208 and the fourth side arm 210 of the second clip 34, such as by inserting the second lug 102 through the passage 246 of the second clip 34. For instance, the third side arm 208 may extend along a first lateral side of the second lug 102 while the fourth side arm 210 may extend along a second lateral side of the second lug 102 that is disposed opposite the first lateral side. It is noted that the fourth side arm 210 is disposed directly behind the third side arm 208 in FIG. 3.

A brake assembly as previously described may allow a sensor to be mounted to a brake pad assembly by clipping the sensor unit to a brake shoe or backplate. Such a configuration may permit the sensor unit to be compatible with multiple brake pad assembly configurations. In addition, such a configuration may allow a sensor unit to be installed or removed independent from the manufacturer of the brake pad assembly. For instance, a sensor unit may be used instead of a sensor that is received inside of the friction material or that is installed in place of a rivet that secures the friction material to the table during the brake pad assembly manufacturing process. As such, a sensor unit may be compatible with a brake pad assembly that is not manufactured with a sensor and may allow a brake pad assembly to be retrofitted with a sensor unit. The sensor assembly may be configured to provide easy installation and robust retention once installed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake assembly comprising:
   a brake pad assembly having a table and friction material that extends from the table;
   a sensor unit that is mounted to the table; and
   a clip that straddles the sensor unit and engages the friction material,
   wherein the friction material includes a first friction material portion and a second friction material portion, a channel is provided between the first friction material portion and the second friction material portion, and the sensor unit and the clip are received in the channel.

2. The brake assembly of claim 1 wherein the clip is spaced apart from the table.

3. The brake assembly of claim 1 wherein the sensor unit has a first lug and a second lug that cooperate to define a recess that receives the table, wherein the first lug and the second lug straddle the table such that the first lug is received in the channel.

4. The brake assembly of claim 3 wherein the sensor unit has a recess end surface that extends from the first lug to the second lug, and the table contacts the recess end surface.

5. The brake assembly of claim 3 wherein the sensor unit extends further away from the table than the clip extends away from the table.

6. The brake assembly of claim 5 wherein the clip has a clip end wall, a first clip side wall that extends from the clip end wall, and a second clip side wall that extends from the clip end wall and is spaced apart from the first clip side wall, wherein the first clip side wall contacts the first friction material portion and the first lug and the second clip side wall contacts the first lug and the second friction material portion.

7. The brake assembly of claim 6 wherein a sensor is disposed inside the first lug and is positioned between the first clip side wall and the second clip side wall.

8. The brake assembly of claim 3 wherein the sensor unit includes a sensor that is disposed inside the first lug.

9. The brake assembly of claim 3 wherein a stiffener is disposed inside the first lug.

10. The brake assembly of claim 9 wherein a sensor is disposed inside the first lug and the sensor is disposed on the stiffener.

11. The brake assembly of claim 9 wherein a sensor is disposed inside the first lug and the sensor extends further from the table than the stiffener extends from the table.

12. The brake assembly of claim 3 wherein the first lug has a first slot end wall that is disposed in the channel, and a first slot that extends from the first slot end wall and extends away from a distal end of the first lug, wherein the first lug has a first wing that extends toward the first friction material portion, and a first ramp that is disposed in the channel and spaced apart from the first wing, wherein the first slot is disposed between the first wing and the first ramp.

13. The brake assembly of claim 12 wherein the clip is disposed closer to the table than the first slot end wall is disposed to the table.

14. The brake assembly of claim 12 wherein a sensor is disposed inside the first lug and the sensor is disposed closer to the table than the first slot end wall is disposed to the table.

15. The brake assembly of claim 1 wherein a first lug of the sensor unit is disposed in the channel, the first lug having a distal end that is disposed in the channel, a first set of ramps that extends toward the first friction material portion, and a second set of ramps that is disposed opposite the first set of ramps and that engages the second friction material portion, wherein the clip engages the distal end, the first set of ramps, and the second set of ramps.

16. The brake assembly of claim 15 wherein the clip engages a first member of the first set of ramps and a first member of the second set of ramps disposed closest to the distal end.

17. The brake assembly of claim 15 wherein a stiffener is disposed inside the first lug and the stiffener extends further from the distal end than the first set of ramps and the second set of ramps.

* * * * *